United States Patent [19]

Mudge

[11] Patent Number: 4,788,230
[45] Date of Patent: Nov. 29, 1988

[54] PROCESS FOR MAKING A LOW DENSITY SYNTACTIC FOAM PRODUCT AND THE RESULTANT PRODUCT

[75] Inventor: Robert S. Mudge, Altamonte Springs, Fla.

[73] Assignee: The Boeing Company, Seattle, Wash.

[21] Appl. No.: 781,866

[22] Filed: Sep. 30, 1985

[51] Int. Cl.$^4$ .............................................. C08J 9/32
[52] U.S. Cl. .................................... 523/219; 264/123; 264/DIG. 6
[58] Field of Search ......................... 264/DIG. 6, 123; 523/218, 219; 428/313.3, 313.7, 313.5, 313.9; 521/54, 55

[56] References Cited

U.S. PATENT DOCUMENTS

| | | | |
|---|---|---|---|
| 2,806,509 | 9/1957 | Bozzacco et al. | 264/DIG. 6 |
| 2,985,411 | 5/1961 | Madden, Jr. | 264/DIG. 6 |
| 3,608,010 | 9/1971 | Stayner | 264/DIG. 6 |
| 4,134,848 | 1/1979 | Adicoff et al. | 523/219 |
| 4,374,874 | 2/1983 | Blitstein et al. | 523/219 X |
| 4,403,048 | 9/1983 | Blitstein et al. | 523/219 X |
| 4,582,756 | 4/1986 | Niinuma et al. | 428/313.3 X |

FOREIGN PATENT DOCUMENTS 2386409 12/1978 France ......................... 264/DIG. 6

OTHER PUBLICATIONS

*The American Heritage Dictionary*, Second College Edition, Boston, Houghton Mifflin Co., ©1982, p. 754.

*Primary Examiner*—Philip Anderson
*Attorney, Agent, or Firm*—J. Michael Neary

[57] ABSTRACT

A process for mixing a magma that can be used to make a structural syntactic foam of very low density includes the steps of mixing and agitating the dry ingredients of the foam, principally silica microspheres, in a slant cone mixer to break up any lumps and achieve a uniform fluffy mixture, and spraying a resin/solvent solution as a fog of fine droplets into the mixture. The resulting magma is folded and agitated within the mixer until the resin uniformly coats the microspheres, and the resin is packed into a mold. The filled mold is pressurized and heated in an autoclave until the resin is cured, and then the mold is cooled and opened and the finished syntactic foam part is removed.

17 Claims, 2 Drawing Sheets

PROCESS FOR MAKING A LOW DENSITY SYNTACTIC FOAM PRODUCT AND THE RESULTANT PRODUCT

BACKGROUND OF THE INVENTION

This invention relates to a method of mixing low density syntactic foam, and more particularly to a method mixing a low density syntactic foam made of glass microspheres held in a rigid matrix with a minimal volume of bonding agent.

For purposes herein, a syntactic foam shall be defined as a material comprised of hollow microspheres adhered together with a bonding agent. A low density syntactic foam is a syntactic foam using only as much bonding agent as is required to bond the microspheres together at their adjacent or contacting edges in a rigid matrix.

Syntactic foams are useful for a number of applications. Their primary advantage is that they afford rigidity and structural strength at very low density compared to conventional structural materials. Syntactic foams may be used as fillers in honeycomb material to add rigidity and strength to the honeycomb structure. Syntactic foams are also formed or molded into the shape of the final part and then covered with a structural skin, such as composite material, to lend strength and desired skin characteristics to the part.

Syntactic foams are also useful as a rigid matrix for holding other desirable materials in a low-density, spatially fixed relationship. For example, syntactic foam made with metallic coated microspheres and formed in a sheet serves as an excellent low density shielding material against electromagnetic radiation. The material can also be mixed with various fibers, flakes and granules for enhanced structural, chemical and/or electrical characteristics. Finally the material affords an excellent model molding compound because of its light weight and stable nature.

Basically, syntactic foam is manufactured simply by mixing hollow glass microspheres with a bonding agent and allowing the bonding agent to cure in the desired shape. However, difficulties immediately arise as one attempts to mix conventional bonding agents with the microspheres. The microspheres are extremely small, on the order of 50 to 150 microns in diameter, and very lightweight so that they take on the characteristic of a fine dust. They are also relatively fragile so that rough handling may cause breakage of the glass microspheres. Accordingly, great difficulty has been encountered in mixing the glass microspheres with the stiff and viscous resins and the other common bonding agents used in the manufacture of syntactic foams.

The conventional solution is to mix a sufficient volume of solvent with a bonding agent to reduce its viscosity to the level at which it can be mixed readily with and completely wet the microspheres in a homogeneous pasty mass or magma without extensive damage to the microspheres in the mixing process. This technique works well to create a homogeneous magma and to minimize breakage of the microspheres, but it creates a host of problems. Perhaps the most serious problem created by excess solvent is that it tends to draw the resin off of the microspheres during solvent evaporation and, because the resin and solvent solution is heavier than the microspheres, it tends to sink to the bottom of the mixing container when the mixer is turned off. To prevent this separation of solvent/resin from the microspheres, the magma must be continually mixed until the solvent moiety is reduced to the point that the mixture becomes stable.

Another problem caused by excess solvent is that a soupy or liquid mixture of resin and solvent in the solid components promotes separation of the solid components into regions of equal density, so that the microspheres tend to float to the top of the mixture, the fibers, flakes or granules float below that, and the solvent and resin solution sinks to the bottom.

The excess solvent in a solvent-rich solution must be evaporated before the magma can be packed into a mold because otherwise the components will separate within the mold and create the same problem as discussed above. This effect makes it difficult to obtain homogeneous batches from batch to batch and also within a particular batch wherein the materials are uniformly and homogeneously distributed throughout the material.

The necessity of evaporating the excess solvent requires more than simply spreading it out over a large surface area and allowing the solvent to evaporate. The material must be continually stirred, otherwise the microspheres float to the top and form a skin which then slows the evaporation of the solvent and creates an undesirable material. The continual stirring is a labor-intensive process because the material must be stirred gently and must be checked continually to ensure that it does not separate and harden before use. The evaporating solvent, of course, is lost, which is wasteful of the solvent and increases the cost of the material, and it requires special provisions to exhaust the evaporating solvent from the work area.

Accordingly, it has long been a need in the art to provide a method of mixing a magma for making syntactic foam with no more than the amount of solvent that is optimum for such a magma, such that the microspheres and the bonding agent can be mixed in a homogeneous magma without damage to the microspheres and without a separate solvent evaporation step.

SUMMARY OF THE INVENTION

It is an object of the invention to provide a method of mixing the ingredients of a magma for producing a syntactic foam at exactly the right proportions for packing into a mold without damaging the glass microspheres. It is another object of the invention to provide a method of making syntactic foam parts with excellent homogeneity throughout the material and consistency from batch to batch. It is yet another object of the invention to provide a syntactic foam part made by the aforesaid methods.

These objects are obtained in a preferred embodiment of the invention wherein the microspheres, and whatever other solid component ingredients of the foam are to be utilized, are mixed in a tumbling mixture until a homogeneous mixture of the dry ingredients is achieved. A resin/solvent solution at a ratio of less than 1 ml of solvent to 4 grams of resin is sprayed under pressure as a mist or fog of tiny droplets into the mixture while tumbling and agitating the mixture with a rotating paddle agitator until the microspheres are uniformly coated with a thin coating of resin/solvent solution.

DESCRIPTION OF THE DRAWINGS

The invention and its many attendant objects and advantages will become better understood upon reading the following description of the preferred embodiment in conjunction with the following drawings; wherein.

DESCRIPTION OF THE PREFERRED EMBODIMENT

Figure 1:
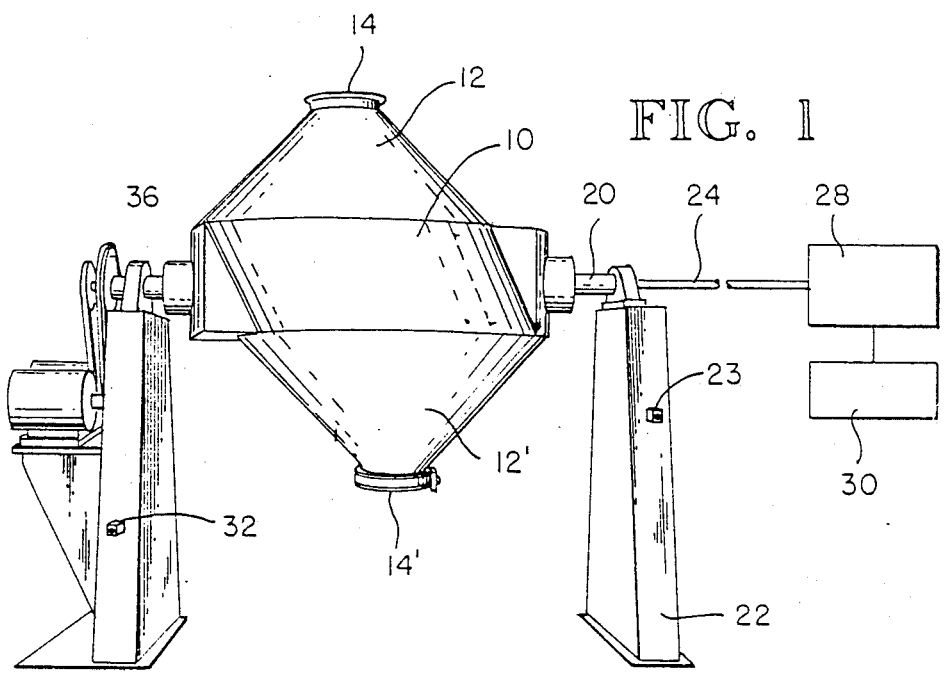
FIG. 1 is an isometric view of a mixer for mixing the ingredients of a magma for producing a syntactic foam according the this invention.

The predominant dry ingredient of a syntactic foam according to this invention is microspheres in the range of 50 to 150 microns in diameter. Microspheres are available in various materials, but the preferred material for low density syntactic foams is silica glass microspheres because of their extremely low density, attained primarily by extremely thin walls without sacrificing relatively high strength. However, they must be handled gently during processing to prevent breakage of the ultra-thin wall of the microsphere.

In a low density syntactic foam, the microspheres are held in a rigid matrix by a bonding agent which adheres the adjacent microspheres to each other. An epoxy resin is commonly used as the bonding agent, although other bonding agents can be and have been used with good results. Low density syntactic foams are distinguished from ordinary syntactic foams by the use of minimal resin in the low density material. Just sufficient resin is used to form a thin coating on the microspheres by which they are adhered together. This requirement of minimal resin imposes much more stringent requirements of uniform mixing and maintenance of homogeneity throughout the material in order to provide a satisfactory material. The ratio of resin to microspheres must be precisely determined and controlled, and the ratio of solvent to resin must be held as low as possible to prevent the solvent from washing the resin from the microspheres during mixing and subsequent molding.

The process for making the syntactic foam begins with careful measurement of the ingredients to ensure that the correct amount of resin and solvent is used for the amount of dry ingredients. The ratio is determined primarily by the surface area of the dry materials and will vary somewhat within the ranges described herein, depending on the presence of fibers, flakes, or powders in addition to the microspheres.

The resin solution is measured and mixed and held in a container to be pumped into the vessel. The resin solution includes the resin, the catalyst, and the solvent for the particular resin being used.

The feedlines from the container of resin solution through the pump into the mixer nozzle are primed with resin solution and purged of any cleaner remaining in the line from the previous use of the mixer. Advantageously, the mixer pump is run until the resin just starts spraying through the spray nozzle. During this process, a bucket can be held under the spray nozzle to prevent cleaner from being pumped into the mixer vessel. When the feed lines are primed full of the resin solution, the resin feed container is charged with the precisely measured quantity of resin solution to be pumped into the mixture. During the mixing process, when the resin is to be pumped into the mixer, the pump is run until the container is completely empty and then the pump is shut off to stop the flow of resin into the mixer. This ensures that the precisely predetermined quantity of resin solution is pumped into the mixer.

The dry ingredients are loaded into the mixer vessel and are tumbled together by rotating the vessel to loosen and distribute the dry materials from a compacted state to a loose and fluffy state. When they have achieved the desired state, after about a minute of tumbling, the agitator in the mixer is started and the dry mixture is tumbled and agitated for about 12 minutes to uniformly distribute all of the materials homogeneously throughout the mixture. The mixture can be checked visually to ensure that there are no lumps or balls of dry material still adhering together in an agglomerated state.

When the desired uniformly of distribution of the dry materials is achieved, the resin solution is pumped into the container through the spray nozzle. The nozzle produces a fog of extremely fine droplets of resin solution which mixes with the cloud of dry material which is produced within the mixer vessel by the tumbling and agitating action of the mixer. The fog of fine resin solution droplets and the cloud of uniformity distributed dry materials produces an excellent interaction to distribute the resin solution uniformly throughout the dry materials. As the particles of dry material encounter droplets of resin solution, they drop out of the cloud which is suspended within the mixing vessel and are agitated with the agglomerated mass and tumbled by the rotating mixer and the agitator.

The mixer continues to tumble and agitate the contents until the resin uniformly coats the dry materials to poduce a homogenous magma, usually on the order of five to ten minutes. The mixer and agitator are turned off and the magma is poured out of the mixer vessel. At this point, the solvent content is reduced to about 6 percent and is so low that the magma can be allowed to stand for a number of hours without undergoing any solvent-induced changes, such as washing the resin off of the microspheres or floating the microspheres to the surface. The mixer is cleaned with ketone to remove the resin, and ketone is pumped through the feedlines and the spray nozzle to remove the resin remaining in the lines. The lines are left filled with ketone to prevent a gradual buildup of resin in the lines.

When the mold is ready, the magma is packed into the mold and the mold is placed in an autoclave where the magma is put under pressure and subjected to a heating cycle. Depending on the resin, the pressure is from 15 to 150 PSI which remains on until the resin has cured. The pressure forces the microspheres into close adjacent proximity or contact, and eliminates large scale voids within the material which could weaken it. The residual solvent diffuses out through the interstices of the material.

After the resin has cured, which normally takes two to six hours at 200° F. to 350° F., the mold is removed from the autoclave and allowed to cool to room temperature. The mold is then opened and the part is removed and cooled. The part is ready for further processing such as painting or coating with other materials or for use as is.

Figure 2:
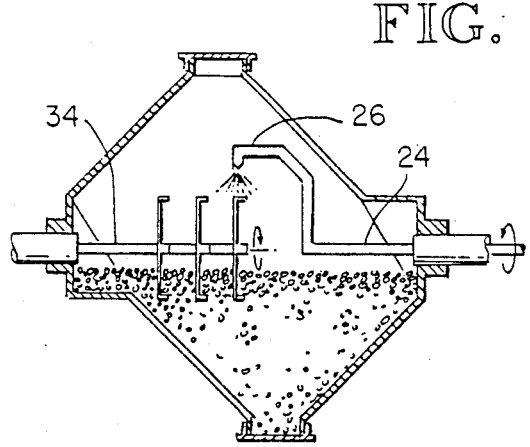
FIG. 2 is a cross sectional elevation of the mixer drum shown in FIG. 1.
Figure 3:
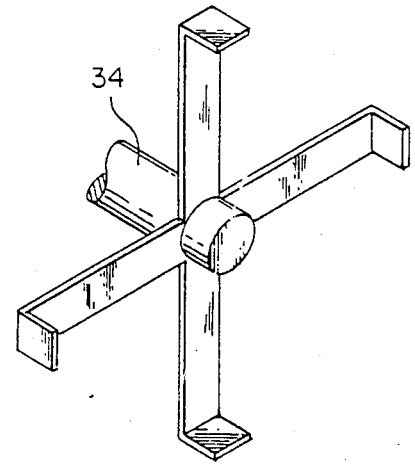
FIG. 3 is an isometric view of the paddle arms shown within the drum in FIG. 2.
Figure 4:
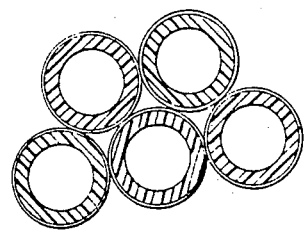
FIG. 4 is an enlarged cross sectional view of a small portion of syntactic foam made according to this ivention.

A mixer used for this process is shown in FIG. 2. Such a mixer is known as a slant-cone blender and can be supplied by General Machine Company of New Jersey, Inc., in Middlesex, N.J. It has a cylindrical body 10 having an axis disposed at an angle to the horizontal axis of rotation. A conical end piece is fastened to each end of the cylindrical body and the conical end piece has a cover 14 for charging and discharging ingredients into and from the vessel formed by the cylindrical body and the conical covers.

The vessel is supported on a horizontal axis for rotation on a hollow drive shaft 20. The hollow drive shaft is driven by a motor and chain drive within a housing 22 and the speed of rotation is controlled from a control box 23. The hollow drive shaft has a pipe 24 extending coaxially through it and terminating in a nozzle 26 by which the resin may be sprayed into the dry ingredients of the foam. A pump 28 is provided for pumping liquid ingredients through the pipe and the spray nozzle, and the pump is controlled from a control box 30.

The other side of the hollow drive shaft contains an agitator shaft 34 which is driven by a motor and chain drive within a housing 36 on the other side of the mixer. The agitator contains four sets of four radial arms, each terminating in a paddle by which the ingredients within the mixer vessel may be agitated. The agitator is controlled from an agitator control box 32 which allows the speed of the agitator to be controlled independently of the speed of rotation of the mixer vessel.

When the mixer vessel is rotated, the contents are thrown back and forth in the direction of the axis of the drive shaft as well as back and forth in the horizontal direction perpendicular to the drive shaft in a double folding motion. In addition, the agitator continues to mix the ingredients as they are folded over and over by the blending action of the rotating vessel. The result is a gentle and thorough mixing of the ingredients without the intense localized shear and crushing action of conventional mixing blades.

The following example will serve to exemplify the invention. Obviously, this example is meant for illustration purposes and is not to be construed as limiting the scope of the invention, as defined in the claims.

Silica hollow microspheres from Emerson & Cuming in the size range of 50 to 150 microns are weighed and 1080 grams are charged into the mixer. About 40 grams of structural fiber such as graphite fiber is added and the mixer is tumbled for 1 minute to break up the lumps in the microspheres and separate the fibers. The agitator is then run while the mixer is tumbling for 12 minutes to uniformly disperse the fiber throughout the microspheres. A solution of 900 grams of Dow Epoxy Resin number 332, 300 milliliters of acetone, and 342 grams of Texaco Jeffamine T403 catalyst is pumped through a fine spray nozzle into the cloud of microspheres and fibers to produce a fog of droplets on the order of 6 microns in diameter.

The total mass of material is about 2400 grams and the volumetric capacity of the mixer is about 0.50 cubic feet to yield a ratio of about 4.8 kilograms of material per cubic foot of mixer volumetric capacity. The resin/solvent ratio is a bit less than 1 ml per 4 grams of active ingredients, i.e., resin plus catalyst, which is about a 10-15 percent solvent solution.

The magma is tumbled and agitated for about 10 minutes during which time the solvent continues to flash off, reducing its content from 10-15 percent down to about 6 percent at the end of the mixing cycle. At 6 percent solvent, the solvent no longer has the capacity to wash the resin off the solid materials and the magma is stable at this point and can be stored for several hours without separation of the ingredients.

Figure 5:
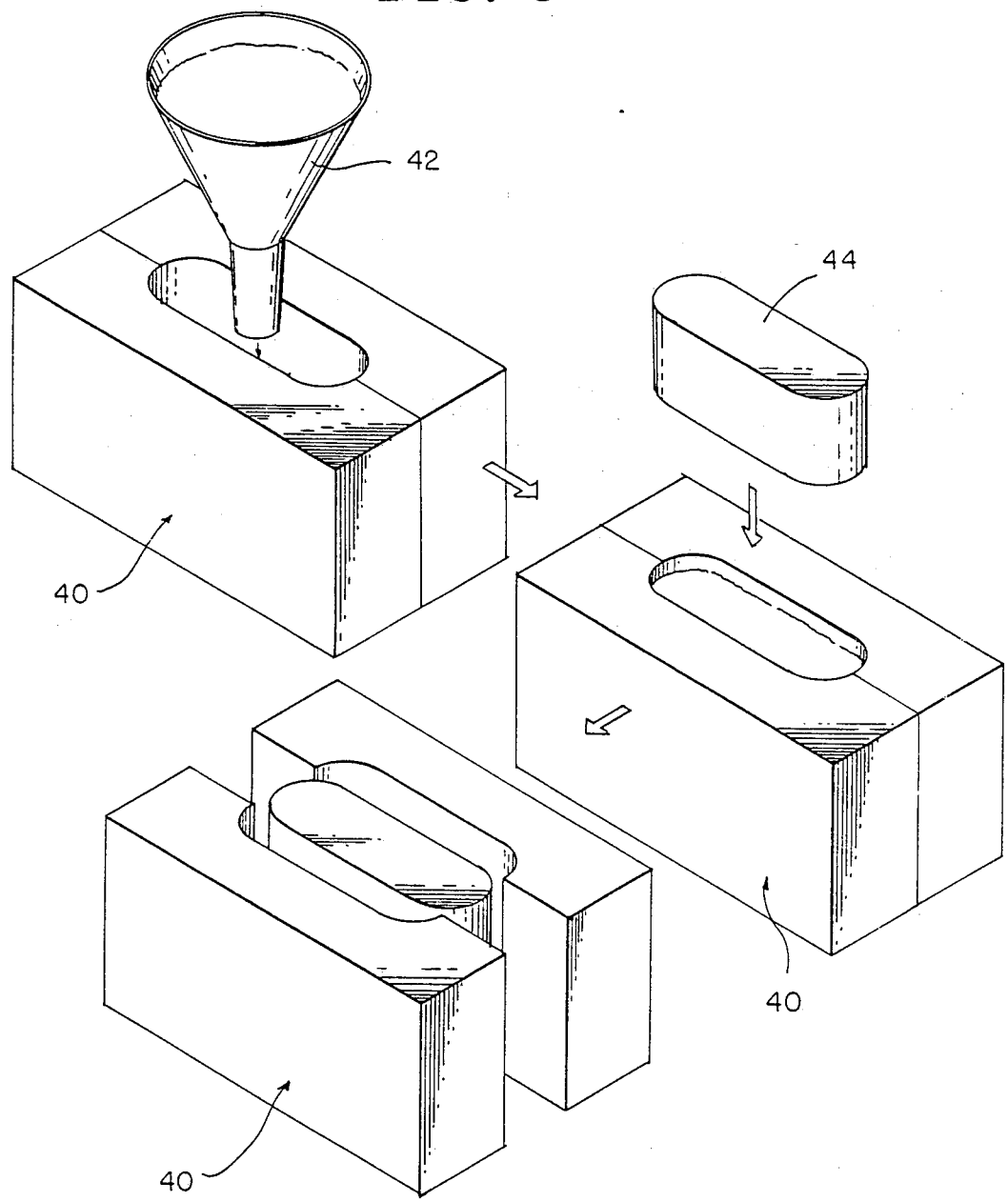
FIG. 5 is a schematic flow diagram showing the steps for making a syntactic foam part according to this invention.

A process for making foam parts from the foam mixture is illustrated in FIG. 5 and includes the use of a mold 40 into which the magma is packed, as illustrated schematically by a funnel 42 and a tamper 44. The filled mold is placed in an autoclave and pressurized to 350 psi and heated to a temperature of 200° F. and maintained at that temperature and pressure for 6 hours. At the end of the heating cycle, the mold is removed from the autoclave and allowed to cool to room temperature. It is opened and the part is removed. The part is a finished part requiring no further treatment unless other coatings or other processes are desired. It will remain dimensionally stable and is strong and lightweight. Specifically, its density is about 18 pounds per cubic foot, its compressive strength is 200 psi, its tensile strength is 350 psi, and its modulous is 4800 psi.

The invention contemplates the addition of other solid materials to the glass microspheres. It is anticipated that the material will be formulated with fibers, flakes and granules for various structural, chemical and electrical properties, depending upon the application for the material. The gentle treatment of the solid materials in the tumbling and agitating blender does not damage the relatively fragile ingredients and does not cause swirls or undesirable uniform orientation of the fibers or flakes within the material. The fibers, flakes or granules are distributed uniformly throughout the microspheres to provide a highly homogenous material. The magma does not require laborious reduction of solvent content and is actually ready for molding immediately after the mixer is opened. The properties of the foam are predictable from batch to batch and are uniform throughout the batch. Density variance within the batch is less than 0.70 pounds per cubic foot for an 18 pound per cubic foot foam as contrasted with 1.0 pound per cubic foot variance for the prior art method of making syntactic foam. The process time for mixing the magma, from the beginning to the condition where it is ready to be inserted into the mold, is reduced from about 4 hours down to about ½ hour.

Obviously, numerous modifications and variations of the disclosed preferred embodiment and examples will occur to those skilled in the art, and it is expressly to be understood that these modifications and variations, and the equivalents thereof, may be practiced while remaining within the spirit and scope of the invention as defined in the following claims:

We claim:

1. A process for mixing a magma for producing a low density syntactic foam, comprising:
   mixing microspheres in a rotating tumbler mixer until a uniform mixture is achieved;
   spraying a resin/solvent solution into said mixture while tumbling said mixture by rotating said mixer and while agitating said mixture with a rotating paddle agitator until said mixture is uniformly coated with a thin coating of resin, said resin/solvent solution having less than a 1.0 ml per 4 grams of resin.

2. The process defined in claim 1, wherein said microspheres and said resin solution in said magma are present at a weight ratio of about 2:3.

3. The process defined in claim 1, wherein said resin includes an epoxy resin and a catalyst/hardener.

4. The process defined in claim 3, wherein said solvent is acetone.

5. The process defined in claim 1, wherein said mixing, spraying, tumbling and agitating are done in a slant cone mixer.

6. The process defined in claim 5, wherein said mixer is filled to about 30-50% with said microspheres, and the other ingredients are added thereafter while said mixer is operating.

7. The process defined in claim 1, wherein said resin/solvent is sprayed in a fog of droplets in the range of 4-10 microns.

8. The process defined in claim 1, wherein said resin coating on said microspheres, when cured, is about 1 micron thick.

9. A magma for producing a low density syntactic foam made by the process defined in claim 1.

10. A process of making a low density syntactic foam part comprising:
    mixing microspheres in a rotating mixer until a uniform mixture is achieved;
    spraying a resin/solvent solution into said mixture while tumbling said mixture by rotating said mixer and while agitating said mixture with a rotating paddle agitator until said microspheres are uniformly coated with a thin coating of resin to form a homogeneous magma, said resin solvent solution having less than 1.0 ml per 4 grams of resin;
    packing said magma into a mold;
    pressurizing said magma in said mold to express excess air voids and force said microspheres into close juxtaposition;
    allowing said resin to cure while maintaining said pressure; and
    opening said mold and removing said part.

11. The process defined in claim 10, further comprising:
    heating said magma in said mold at a temperature greater than 210° F. while said resin cures.

12. The process defined in claim 10, wherein said resin and said solvent are present in said magma at a ratio of about 2:3, respectively, by weight.

13. A low density syntactic foam part made by the process of claim 12.

14. The process defined in claim 12, wherein said resin/solvent solution is sprayed into said mixer in a fog of droplets on the order of 4-10 microns in diameter.

15. The process defined in claim 14, wherein said resin/solvent solution is pumped into said mixer through a spray head at a pressure between 30-60 psi.

16. The process defined in claim 12 wherein said microspheres are agitated by said agitator and form a cloud of microspheres suspended in said mixer until they encounter a droplet of resin, whereupon they drop out of the cloud and are tumbled and mixed by the mixer until the resin is uniformly coated over all the microspheres.

17. The process defined in claim 10, wherein said mixer is loaded with material of a mass loading of about 3.6-4.8 grams/ft$^3$ of mixer volumetric capacity.

* * * * *